United States Patent [19]

Darden

[11] Patent Number: 4,664,330
[45] Date of Patent: May 12, 1987

[54] DRAG WASHER

[75] Inventor: Dennis W. Darden, Tulsa, Okla.

[73] Assignee: Brunswick Corporation, Skokie, Ill.

[21] Appl. No.: 832,970

[22] Filed: Feb. 25, 1986

Related U.S. Application Data

[63] Continuation-in-part of Ser. No. 677,671, Nov. 20, 1984, abandoned.

[51] Int. Cl.⁴ .................. A01K 89/01; A01K 89/02
[52] U.S. Cl. ..................... 242/84.5 A; 188/251 A; 188/264 B; 384/370; 464/8; 464/903
[58] Field of Search ............... 242/84.5 A, 84.5 R, 242/84.51 A, 84.51 R, 84.5 P; 384/370, 909, 911; 308/D68; 464/8, 10, 903; 188/264 B, 251 A

[56] References Cited

U.S. PATENT DOCUMENTS 3,915,034 10/1975 Ward ........................... 188/264 B
4,371,124 2/1983 Gifford et al. ............... 242/84.51 A
4,378,914 4/1983 Shackelford et al. ....... 242/84.21 A

OTHER PUBLICATIONS

Brochure by The Barden Corporation "Barden has a Better Answer", 2-1983.

Primary Examiner—Billy S. Taylor
Attorney, Agent, or Firm—Wood, Dalton, Phillips, Mason & Rowe

[57] ABSTRACT

Friction drag washers for the drag assemblies of fishing reels are provided. The washers are made of a phenolic fiber material which is impregnated under vacuum with oil or an oil and STP oil additive solution. The viscosity of the oil can be changed to accommodate the general conditions of intended use of the reel (i.e. high drag setting—high speed withdrawal—low viscosity oil). The impregnation of the washer affords a self-lubricating lifetime washer which does not need to be changed during the life of the reel. The impregnated washers are easier and quicker to install since they do not need to be greased as they are installed.

3 Claims, 7 Drawing Figures

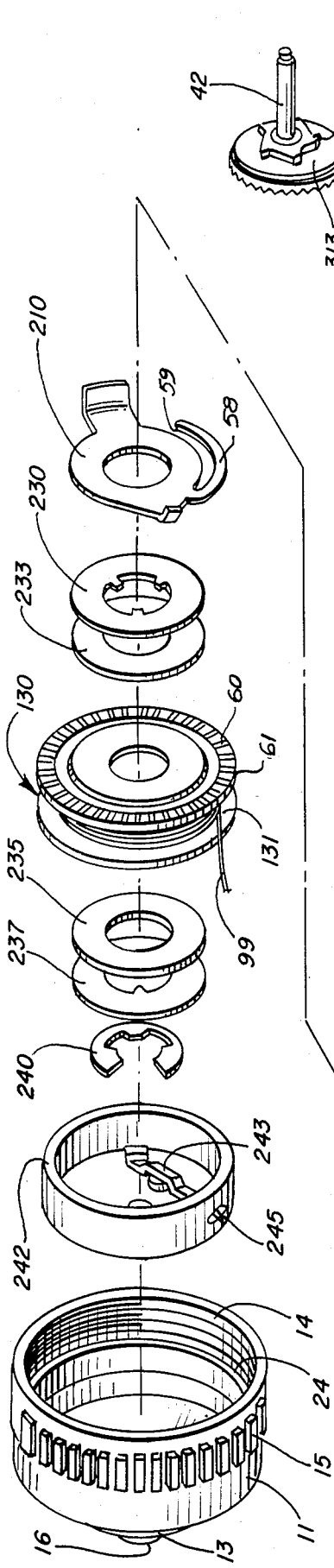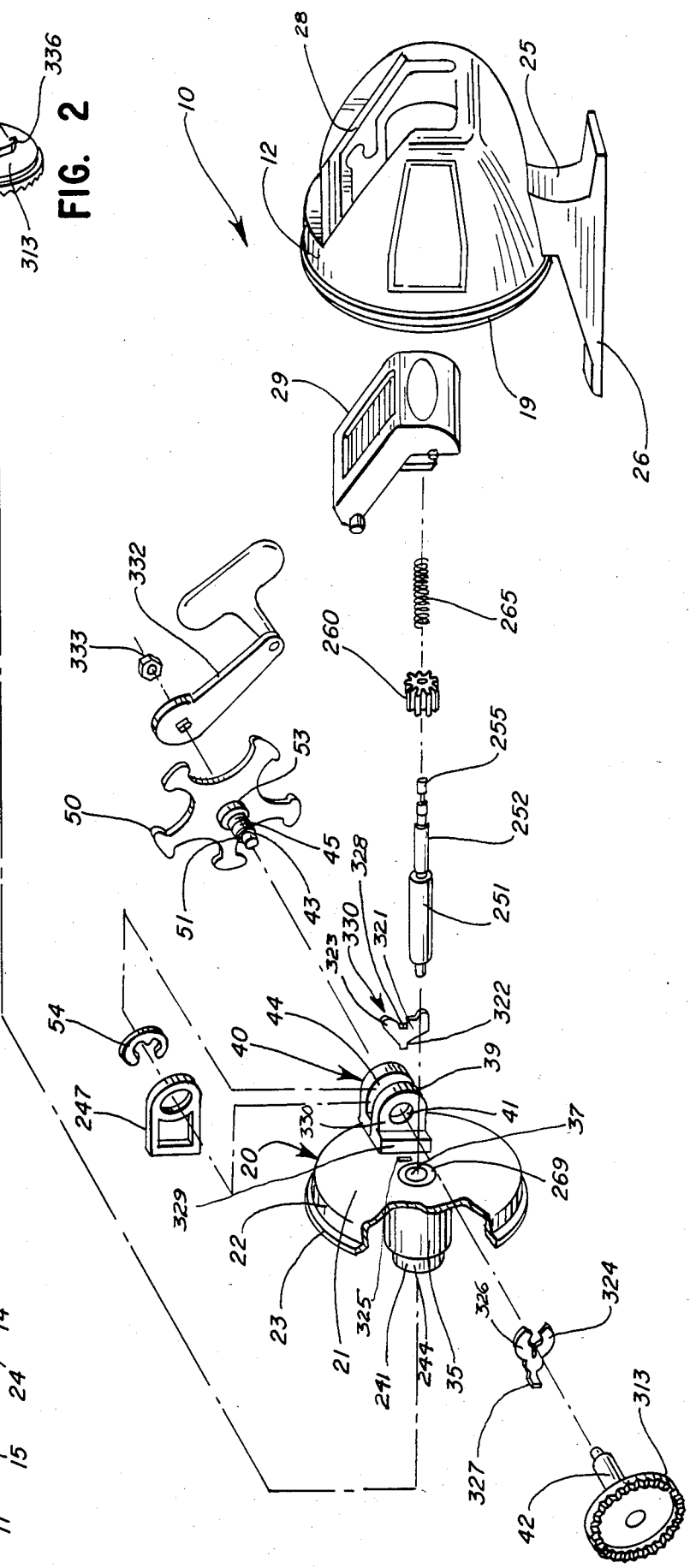
FIG. 2
FIG. 1

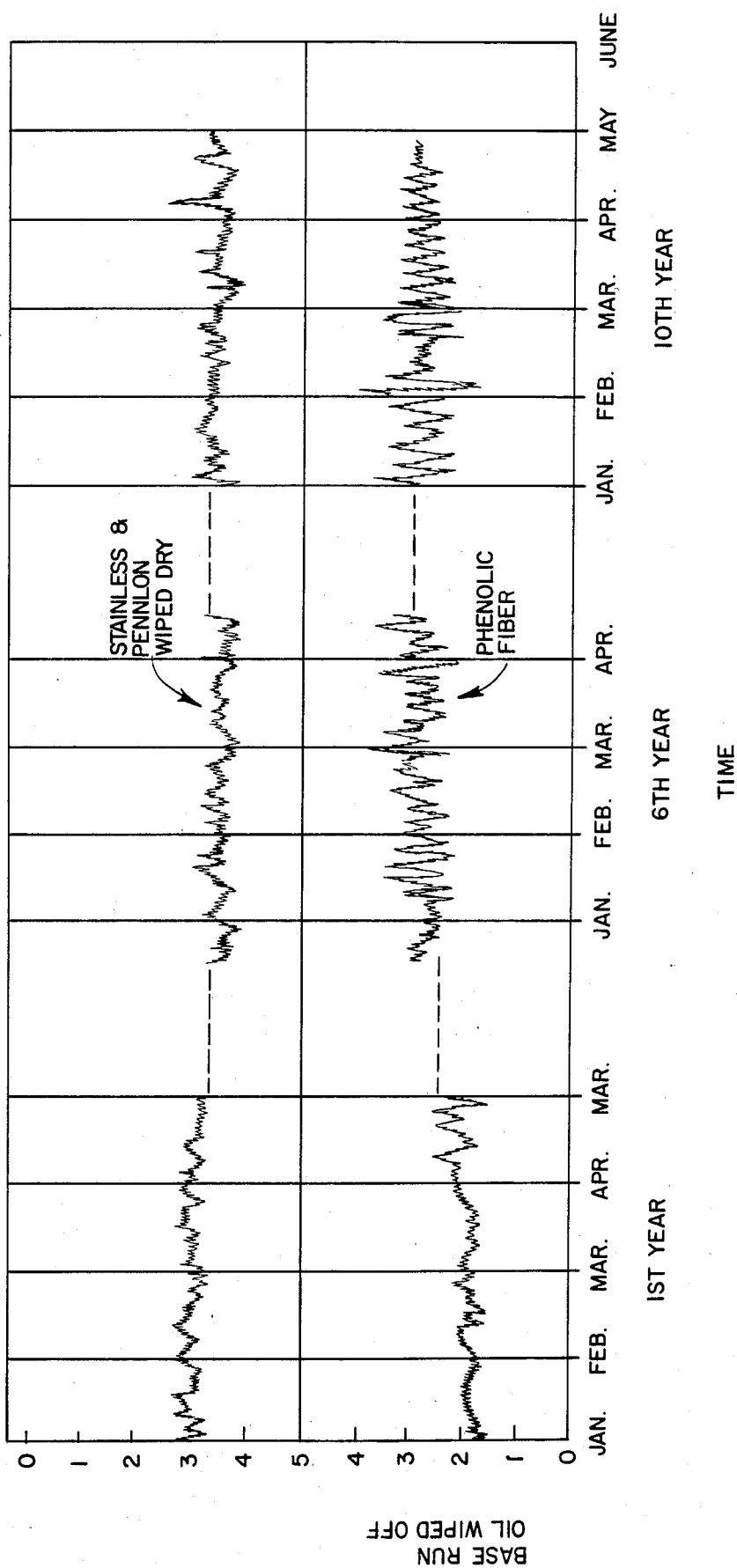

DRAG WASHER

CROSS-REFERENCE

This is a continuation-in-part application of Ser. No. 677,671 filed Nov. 20, 1984 and now abandoned.

DESCRIPTION

1. Technical Field

This invention relates to fishing reels and more particularly to fishing reels having a drag washer as part of the drag system operating on the spool.

2. Background Art

Fishing reels such as spin cast style fishing reels have drag assemblies for applying varying degrees of drag on drag washers bearing directly or indirectly on the spool for varying the tension on the line required to rotate the spool relative to the reel housing. A typical spin cast style reel is shown and described in the Shackelford et al U.S. Pat. No. 4,378,914 wherein the drag on the spool and line is varied by rotating a thumb wheel which increases and decreases pressure on drag washers bearing on the spool. A typical spinning style reel is shown and described in Gifford et al U.S. Pat. No. 4,371,124 wherein drag washers bear on parts in the drag assembly for varying the tension on the line required to rotate the spool relative to the reel housing. In both cases the drag is set so that the tension on the line will not exceed the line rating resulting in breaking of the line.

An essential element of drag assemblies is the so-called friction washers which are compressed between an axially movable, non-rotatable member and a rotatable member which may be the line spool or which may be a member fixed on a shaft upon which the line spool is mounted. The compression on the friction washers is increased or decreased to increase or decrease the resistance to rotation of the spool. Failure or breakdown of the friction washer results in failure of the reel since the reel cannot operate either (1) without some resistance to withdrawal of the line from the spool so that it is almost impossible to retrieve the line since any resistance on the line will rotate the spool preventing winding of the line or, (2) if the friction washer has frozen or become bound to the adjacent parts of the drag assembly, any pull on the line in excess of the line rating will snap the line. Materials used for current friction washers, although generally reliable, do have life limits which are less than the normal projected life span of the reels, requiring replacement during the life of the reel to keep the reel operating at its maximum capacity.

In current reels using conventional drag washers a grease is applied during assembly, which grease becomes too stiff, especially in cold weather. The stiffness causes the drag components to stick together at the low end drag settings resulting in a tight drag which is unsuitable, especially for light lines.

DISCLOSURE OF THE INVENTION

This invention relates to friction washers for drag assemblies for fishing reels. The drag washers are made of a phenolic fiber material which is impregnated under vacuum with oil and STP. The viscosity of the oil used may be changed depending on the general intended use of the reel. The impregnation of the washer renders the washer self-lubricating for life reducing installation and assembly costs and substantially eliminates the need to return the reel for repair or replacement of the drag washers in the drag assembly.

The washers no longer need to be lubricated with grease during assembly, eliminating the stiffness and sticking problem of the prior art. The improved washers break away more uniformly and operate continuously and smoothly throughout the anticipated life cycle of the reel.

BRIEF DESCRIPTION OF DRAWINGS

FIG. 1 is an exploded view of one style fishing reel embodying the invention;

FIG. 2 is a rear perspective view of the gear and ratchet of the crankshaft;

FIG. 7 is a drag curve for a ten-year life cycle test comparing LE Linen Bakelite drag washers impregnated with oil and then wiped off and the prior art stainless and pennlon washers impregnated with oil and then wiped off.

BRIEF DESCRIPTION OF BACKGROUND STRUCTURE

Figure 3:
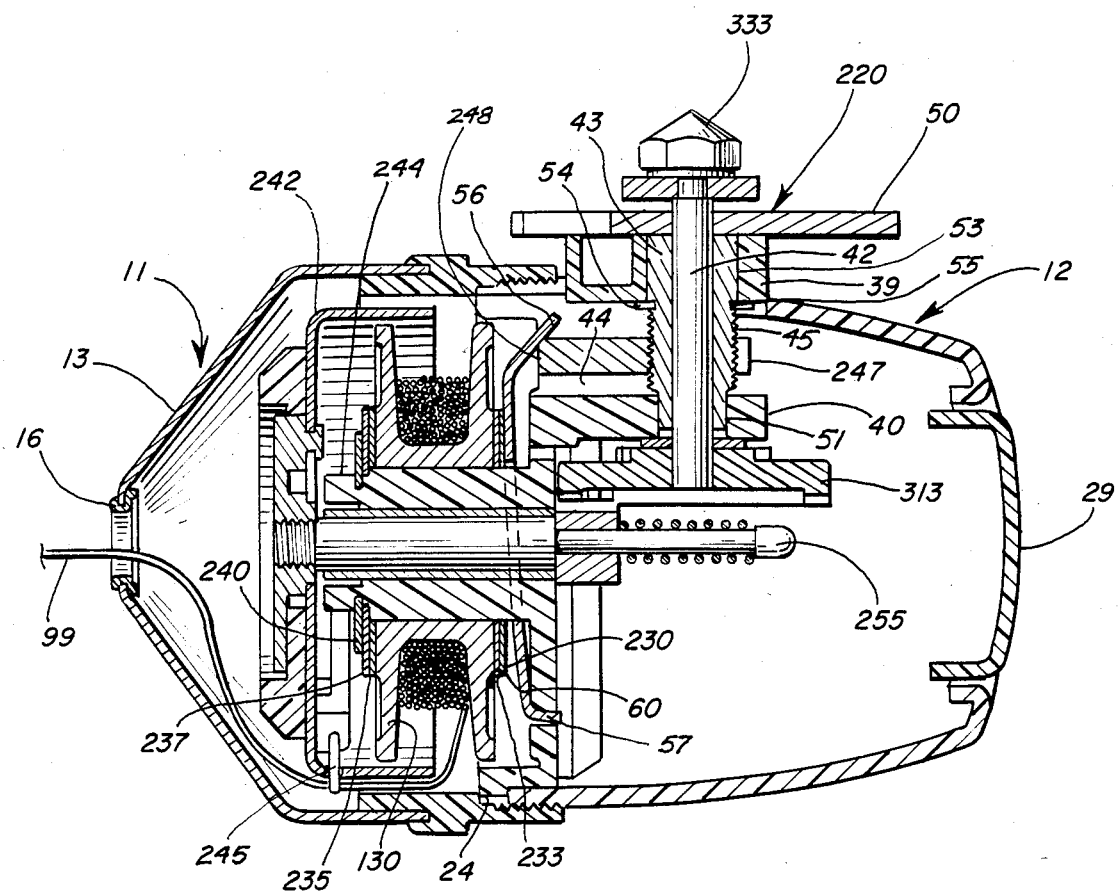
FIG. 3 is a vertical cross-sectional view taken along a vertical plane through the middle of the reel of FIG. 1.

Referring to FIG. 1, there is shown a reel including a closed face housing 10 having a front cup-shaped cover 11 and a rear cup-shaped cover 12. The cover 11 has a conical front portion 13 including a circular line opening that mounts an annular line guide 16 in a known manner. The front cover 11 has helical threads 14 formed on the rear-most internal surface thereof and has knurled gripping portions 15 formed on the external surface thereof. The rear cover 12 has on its forwardly facing end portion an external thread 19. A reel body 20 is provided and includes a circular deck plate 21 which has a forwardly extending cylindrical sleeve portion 22 with an outwardly extending flange 23 extending radially beyond the outer surface of the sleeve portion 22. The front cover 11 is undercut rearwardly of the internal thread 14 to provide a rearwardly facing shoulder 24 axially spaced from the end of the internal thread 14. The rear cover is fit over the cylindrical sleeve portion 22 of the deck plate and bears against the flange 23. The front cover is aligned with the flange 23 and rear cover 12 and is threaded on to the thread on the rear cover until the shoulder 24 bears against the flange 23 to trap the reel body between the front cover 11 and the rear cover 12. An integrally molded, radially extending stem 24 is formed on the rear cover to provide a mounting foot 26 for attachment to an appropriate part of the fishing rod. The rear cover 12 has a rearwardly facing opening 28 in which a thumb button 29 is pivotally mounted.

A central hub 35 is carried by and projects forward of the deck plate 21 concentric with the sleeve 22 with a drag plate 210, back spool washer 230, back flat drag washer 233, spool assembly 130, front flat drag washer 235, front spool washer 237, all retained on the hub 35 by means of spool retainer clip 240 which fits into a groove (not shown in FIG. 1) aligned with a shoulder separating the hub 35 from a reduced diameter front portion 241 of hub 35.

A center shaft 251 is mounted in a sleeve bearing 269 seated in a center hole 37 extending through the deck plate 21 and hub 35, with a spinner head assembly 242 threaded onto the forward threaded end of the shaft 251. The spinner head assembly 242 partially surrounds the forward flange of the spool assembly 130 with a supply of fishing line 99 being wound on a spool 131 of the spool assembly 130. The line 99 is wound or unwound from the spool 131 over the spinner head assembly 242 and through the line guide 16 in the front cover 11.

The center shaft 251 is slidably and rotatably mounted in the sleeve bearing 269 in the deck plate 21. A pinion gear 260 is splined on a reduced diameter spined portion 252 of the center shaft 251 and is resiliently maintained in a forward position against the deck plate 21 by a center shaft spring 265. The spring 265 bears against an abutting end 255 on the center shaft 251 to urge the pinion gear 260 against the deck plate 21 and to urge the center shaft 251 in a rearward direction relative to the deck plate 21. The splined connection between the pinion gear 260 and center shaft 251 permits the axial sliding motion of the shaft 251 relative to the pinion gear 260 while at the same time rotation of the pinion gear 260 will rotate the center shaft 251.

Depressing the thumb button 29 moves the center shaft 251 and spinner head assembly 242 forward relative to the hub 35. As the spinner head assembly 242 moves forward, a pickup pin mechanism 243, mounted on spinner head assembly 242, will move forward of and will disengage from the front portion 241 of the hub 35 and from a cam 244 on the axial face of the front portion 241 of the hub 35 thereby retracting a pickup pin 245 from its extended position radially outward of the spinner head assembly 242.

The deck plate 21 also includes a rearwardly projecting boss 40 having spaced apart legs 39 with aligned transverse openings 41 therethrough for receiving, in a concentric manner, a crankshaft 42 surrounded, in part, by a cylindrical post 43. The boss 40 has a slot 44 between the legs 39, which slot 44 extends transverse to the axis of the opening 41. The slot 44 aligns with a slot (not shown in FIG. 1) in the deck plate 21 with a slide drag actuator 247 positioned in the slots and being threadably engaged with a threaded portion 45 of the post 43. The drag actuator 247 extends through the aligned slots and forward of the deck plate 21 and is moved by rotation of the post 43 in a direction along the axis of the post 43 between the spaced apart legs 39 of the boss 40. The degree of drag braking pressure applied to the spool 131 through the drag actuator 247 is selectively and precisely controllable through a star wheel 50 mounted on the post 43 where the post 43 projects outward of the boss 40. The post 43 has spaced bearing surfaces 51 and 53 which seat in the openings 41. A retainer clip 54 engages in a slot 55 at the junction between the bearing surface 53 and the threads 45 on the post 43, which slot 55 aligns with one wall of the slot 44 so that the star wheel 50 and post 43 can be rotated relative to the boss without the post 43 moving axially relative to the boss 40.

The projecting contact head 248 of the drag actuator 247 engages with an arcuately curved extended ramp cam 56 on the drag plate 210. The drag plate 210 has an anchoring tab 57 located diametrically opposite the cam 56, which tab 57 engages in a recess (not shown in FIG. 1) in the front surface of the deck plate 21. A cantilever arm 58 has a peripheral connection with the drag plate 210 and extends along an arc parallel to a peripheral portion of the drag plate 210. The cantilever arm 58 has an axially facing tip 59 engaging with serrations 60 on the axially facing surface of one flange 61 of the spool 131. The drag plate 210 bears against the back spool washer 230, back flat drag washer 233, spool assembly 130, front flat drag washer 235, front spool washer 237, all of which are backed against the fixed retainer clip 240. The contact head 248 of the drag actuator 247 engages with the cam 56 and, as it is moved radially outward of the drag actuator 247, the pressure or drag on the spool 131 will be increased and, as the drag actuator 247 is moved radially inward on the cam 56, the pressure or drag on the spool 131 will be decreased. The drag actuator 247 is advanced or moved radially inward (decreased drag) by rotating the star wheel 50 in one direction and is retracted or moved radially outward (increased drag) by rotating the star wheel 50 in the opposite direction.

The crankshaft 42, with a gear 313 attached at one end, is inserted through the post 43 in the boss 40 and has a handle 332 attached by means of a nut 333 to the other end of said crankshaft 42. The gear 313 meshes with the pinion gear 260 on the center shaft 251 so that rotation of the crank handle 332 will rotate the center shaft 251 and spinner head assembly 242.

An anti-reverse assembly 330, which is associated with the crankshaft 42, includes a ratchet 336, shown in FIG. 2, fixed on the back of the gear 313 for rotation with the gear 313 and crankshaft 42. The anti-reverse assembly 330 further includes a pivotable pawl 321 having a pivot tab 322, a pawl tooth 323, and a pawl actuator 324. The pawl pivot tab 322 extends into a slot 325 formed in deck plate 21, the slot 325 having one wall in alignment with the one wall 329 which is offset radially inward toward the center shaft 251 from the end face 331 of the boss 40. The pawl actuator 324 has a pair of bifurcated legs 326 which grip the surface of the crankshaft 42 with sufficient force that the pawl actuator 324 will rotate with the crankshaft 42, but will slide relative to the crankshaft 42 when the gripping force is exceeded. An actuator tab 327 extends transverse to the plane of the pawl actuator 324 and engages in a recess 328 in the midportion of the pawl 321. The pawl 321 with the pivot tab 322 in the slot 325 will have one face of the pawl 321 against the wall 329 of the boss 40 and will have the pawl tooth 323 aligned with the ratchet 336. The crankshaft 42, when telescope in the post 43 and boss 40, will locate the pawl actuator 324 between the ratchet 336, fixed on the back face of gear 313, and the end face 331 of the boss 40 in the vicinity of the opening 41 in the boss 40, so that the pawl actuator 324 is offset slightly from the pawl 321 with the transverse actuator tab 327 engaged in the recess 328 of the pawl 321. Rotation of the crank handle 332 in a counterclockwise direction, as viewed in FIG. 1, will pivot the crankshaft 42 and the pawl actuator 324 in a counterclockwise direction which will pivot the pawl 321 in a clockwise direction around pawl pivot tab 322 to move the pawl tooth 323 out of alignment with the teeth of the ratchet 336. The crank handle 332 will, therefore, be permitted to be rotated in the direction without interference. The gripping resistance between the pawl actuator 324 and the crankshaft 42 will be overcome as soon as the pawl 321 pivots to its extreme position, whereupon the crankshaft 42 continues to rotate relative to the pawl actuator 324. Rotation of the handle 332 in the clockwise direction moves the pawl actuator 324 in the clockwise direction with the tab 327 pivoting the pawl 321 in a counterclockwise direction to move the pawl tooth 323 into the path of the ratchet teeth to stop further rotation of the crankshaft 42 and handle 332 in that direction.

BEST MODE OF CARRYING OUT INVENTION

Figure 4:
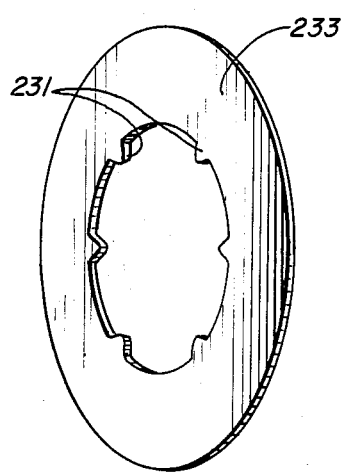
FIG. 4 is an enlarged perspective view of a friction washer embodying the invention.

FIG. 4 shows the drag washer 233 (the same as 235) in enlarged perspective view. In the described reel of FIGS. 1 and 3, the drag washer 233 acts between the non-rotatable drag plate 210 and spool washer 230 bearing against the one side of the spool 130 (which spool is free to rotate on the hub 35) with drag washer 235 bearing between spool washer 237 (which bears against the spool) and against the non-rotatable retainer clip 240. In the form illustrated, the drag washer 233 (and 235) has inward facing lugs or detents 231 which slide axially of the hub 35 in axial grooves formed in the surface of the hub.

Heretofore, the drag washers 233, 235 have been manufactured of a material identified as stainless and pennlon which prior to assembly in a reel, have a lubricant such as grease applied to the surfaces thereof to aid in the spool breaking away when the maximum applied drag load in exceeded. The grease also aids in keeping the drag washer from excessively heating due to the friction caused by relative rotation between the drag washer 233, the drag plate 210 and the spool washer 230 (or spool 130, depending on which rotates and which remains fixed).

It has been discovered that in manufacturing the drag washer to substitute a phenolic fiber material (LE Linen Bakelite) and impregnating the material with either oil alone or an oil and STP oil additive solution produces a drag washer far superior to the stainless and pennlon washers in that they have a longer life with a more uniform drag rating, never need lubrication in that they are self-lubricating, and less expensive to use in manufacturing a reel in that they do not need to be lubricated during assembly of the reel. STP is a registered trademark owned by STP Corporation. Preferably the oil additive is that designated by STP Corporation as their 140 concentrated oil tonic. Any of STP Corporation's oil additives might be used, however.

More specifically, a material identified as LE Linen Bakelite (a phenolic material) is purchased in sheet material of a desired thickness, which sheet is then cut into the desired shape of the drag washer. The drag washers are then impregnated with oil or oil and STP addirive. The resulting impregnated washers when used in a reel produce the improved and unexpected results. In one application, using the oil and STP additive solution, a sheet of LE Linen Bakelite used is 0.032 plus or minus, 0.005 inches thick and cut into the desired shape. A large number of the washers are placed in a basket in a vacuum chamber. A bath of three parts 10 weight oil and one part STP additive is put in the chamber to submerge the washers completely. The vacuum chamber is sealed and a vacuum of not less than 29 inches of mercury is drawn in the chamber and maintained for one hour or until there are no air bubbles percolating to the top of the oil and STP additive solution. The vacuum is released and atmospheric pressure enters the vacuum chamber. The incoming atmospheric pressure compresses and wicks the oil and STP additive solution into the phenolic fiber drag washer. By changing the surface texture of the phenolic fiber washer, you can change the flow rate of the lubricant to the contact area of the spool. The amount of lubricant impregnated into the washer can be changed by adding more wick fibers and/or by taking out some of the resin in making up the phenolic fiber sheet.

The phenolic fiber washers were weighed before and after impregnation with 10 weight oil and STP additive and it was found that approximately 3.9 to 4.0% oil and STP additive impregnation took place in the material of the washers. The amount of impregnation of oil and STP has proven to be sufficient to give a lifetime source of lubrication to the washers and the drag assemblies used therewith. The source of oil or oil and STP additive in the impregnated washers provides cooling as well as lubrication. The viscosity of the lubricant to be impregnated into the washer can be changed to reflect the correct flow rate of the lubricant so that the drag washer will last the life of the reel. As an example, if the drag setting is to be at a five pound load and the speed of the line coming off the spool is 5 mph, a low viscosity oil or lubricant would flow much faster to the heated surfaces than would a high viscosity material, so that one could custom design the lubrication impregnation of the drag washers to meet any desired specification.

To test the new washers against prior art washers, one batch of drag washers was made up of phenolic fiber material (specifically LE Linen Bakelite) and a similar batch of prior art drag washers of the same size and dimension was made up of stainless and pennlon material. Two reels were used for each set of tests with one reel using the new phenolic fiber drag washers and the other reel using the prior art stainless and pennlon washers. The reels were set up side by side on a drag stripping machine. Each reel was preset at a two pound drag setting and was run at 2½ mph for the equivalent of a ten-year life cycle. A 75 yard line was on each spool, with the tests stripping the last 15 yards against the two pound drag setting, after which the 15 yards would be rewound and stripped again. The tests ran continuously for the standard life cycle tests.

Figure 5:
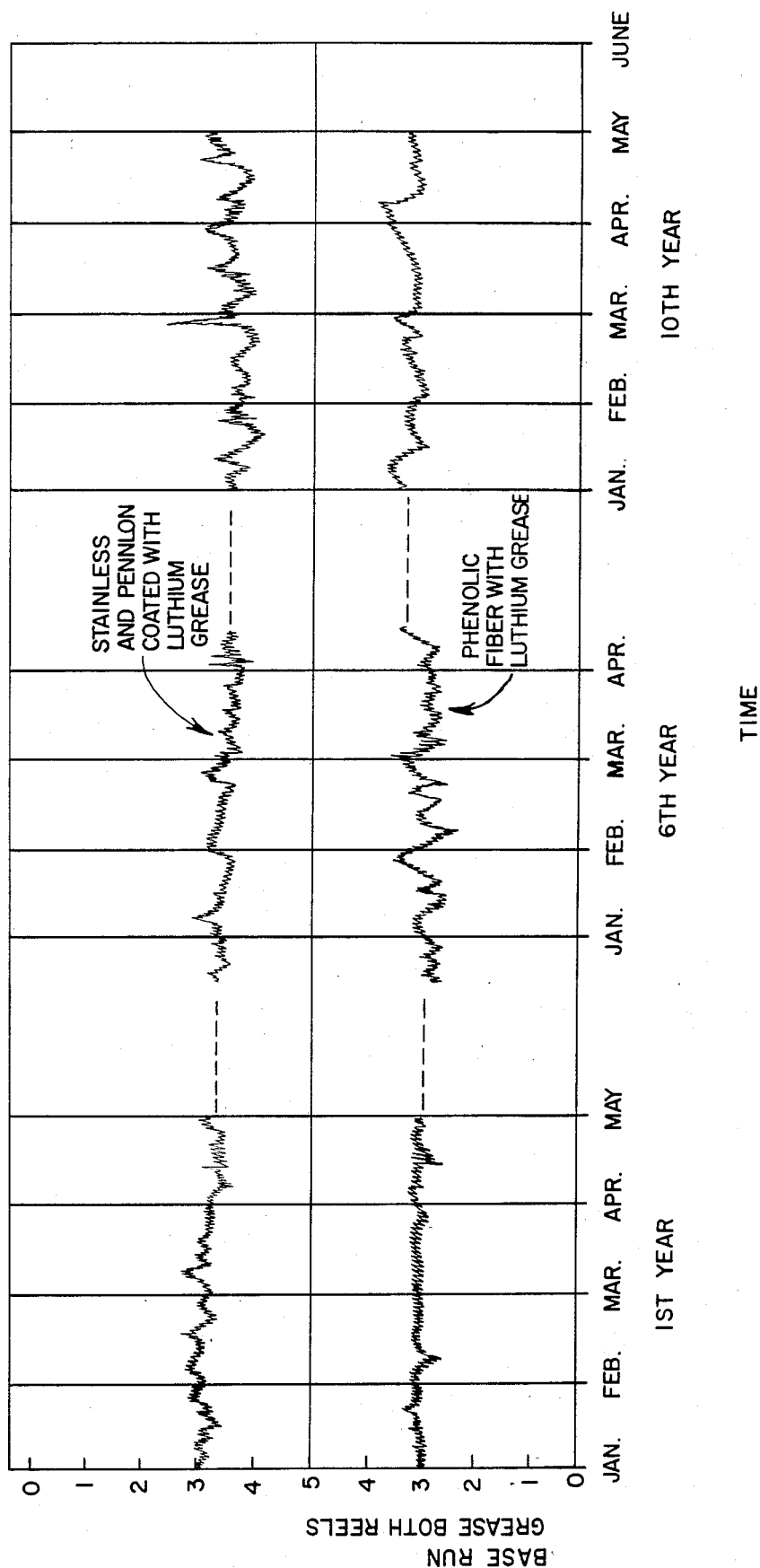
FIG. 5 is a drag curve for a ten-year life cycle test comparing LE Linen Bakelite (phenolic) drag washers and the prior art stainless and pennlon drag washers, both washers being impregnated with grease.

A first test was run to establish whether or not the base materials without impregnation but lubricated with currently used grease would perform equal to, better than or worse than each other. The phenolic fiber drag washers and the stainless and pennlon drag washers were lubricated with Luthium (stock grease) and tested as aforesaid. FIG. 5 shows the charted results. The chart shows the reel with stainless and pennlon drag washers (the prior art) lubricated with Luthium on the top half of the chart with drag readings going from 0 at the top to 5 at the middle. The lower half of the chart shows the reel with the phenolic fiber drag washers lubricated with Luthium and the drag readings going from 0 at the bottom to 5 at the middle. To compact the chart, the years 2 through 5 and 7 through 9 were not illustrated in FIG. 5. With the drag settings of the reels set at 2 pound drag, the tests show that the drag on both reels broke loose at about 3 pounds with the prior art greased drag washer increasing in drag as the tenth year test concluded and the new phenolic fiber grease washer held a fairly steady drag rating throughout the ten-year cycle. The results are so close as to dictate the conclusion that both materials when greased are about equal.

Figure 6:
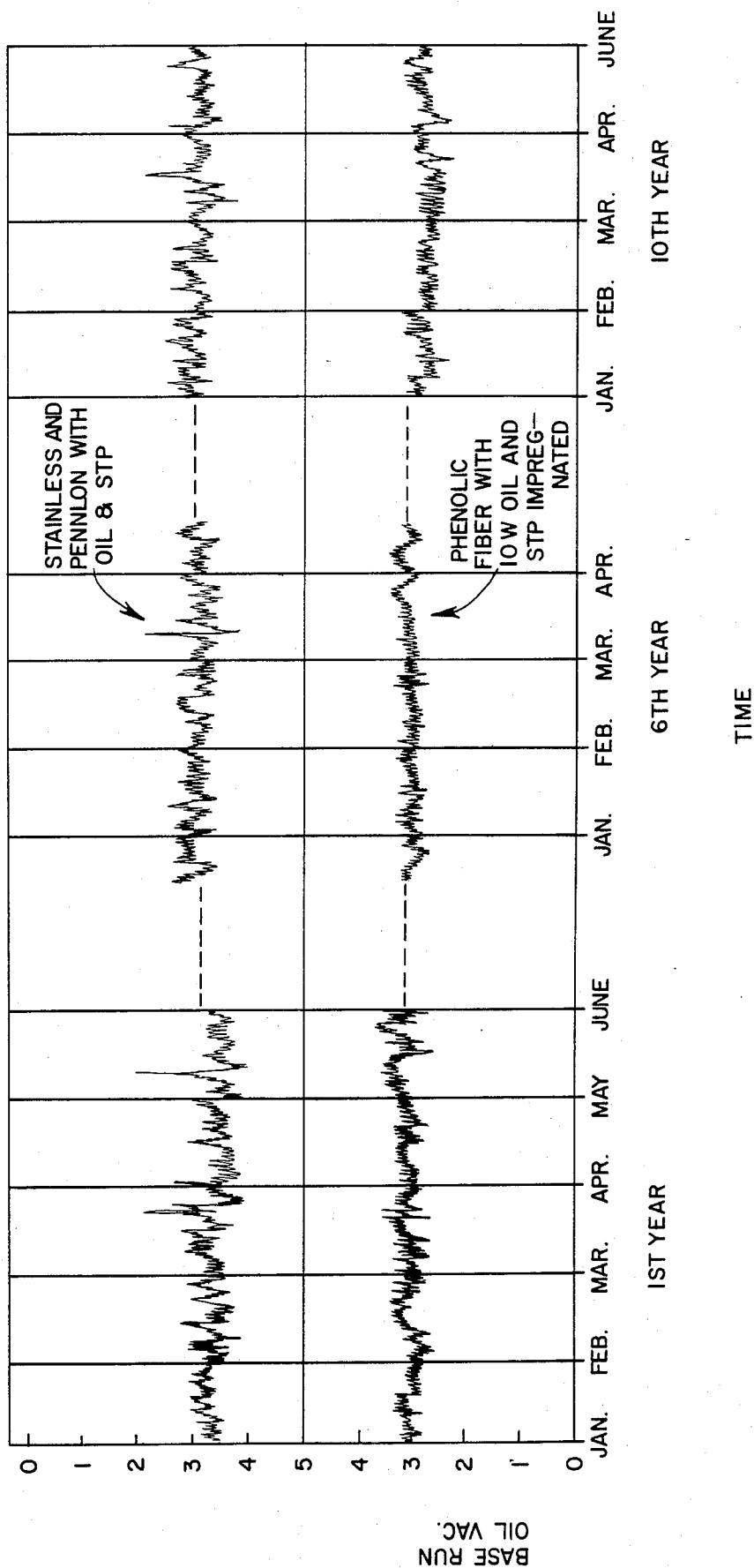
FIG. 6 is a drag curve for a ten-year life cycle test comparing LE Linen Bakelite drag washers impregnated with oil and STP and the prior art stainless and pennlon washers impregnated with oil and STP.

A second test was run using the oil and STP additive impregnated drag washers in one reel and STP additive lubricant on the stainless and pennlon drag washers of the prior art. FIG. 6 shows the ten-year life cycle results with the reel having the prior art washers at the top and the reel having the impregnated phenolic washers at the bottom. From the chart it can be seen that the drag of the prior art reels was up and down (with the drag sometimes being about where desired and other times being way short of the setting; and as the years went by, the drag readings drifted lower). The improved drag with the impregnated washers in the other reel produced smooth, substantially uniform drags which got smoother and more uniform as time went by. The conclusion being that the phenolic fiber oil and STP additive impregnated washers produced a superior drag which remained uniform and smooth for the full life cycle.

A third test was run using a reel with phenolic fiber washers run dry as compared with a reel having the prior art stainless and pennlon washers run dry. FIG. 7 illustrates the comparative results with the prior art washers on the top and the phenolic fiber washers on the bottom. The dry prior art washers appear to be more uniform than the dry phenolic fiber washers. The results indicate that the prior art and phenolic fiber washers can be run dry for a full life cycle, but not as uniformly and smoothly as the oil and STP additive impregnated phenolic fiber washers.

Additional tests were run with 5 pound drag settings at 8½ mph, which would be an extreme set of conditions, such as for Barracuda fishing. The curves were substantially identical with 7 pound break aways and 7½ pound maximum drag. No line breakage occurred.

A start/stop set of tests were run to simulate consecutive multiple short runs such as for Bass fishing. The drags were set at 3½ pounds for the full 75 yards of line on the spool with six starts and stops in the 75 yard length of line. The phenolic fiber washers outperformed the prior art stainless and pennlon washers. Neither drag peaked over 7 pounds and no line was broken.

The invention also contemplates the use of a greater percentage of oil than previously noted or the use of oil alone to impregnate the washers in the manner previously described. 10 weight oil is preferred in each instance. The washers impregnated with only oil exhibited improved operating characteristics over the prior art structures. In the event that no additive is used with the oil, the costs of manufacture are reduced, given that the additive is more expensive than the oil. Further, the need to prepare and keep on hand a solution with measured ingredients is obviated.

From all of the tests, the oil and STP additive impregnated washers were as good as or better than the prior art at the initial breakaway and got smoother and more uniform with age. The oil and STP additive impregnated phenolic fiber washers are less expensive and effect a substantial time and material saving in assembly. The oil and STP additive impregnated washers have lifetime self-lubrication capability, reducing the need for servicing reels for lubrication of the drag washers.

I claim:

1. In a fishing reel having a reel body, a line carrying spool rotatably mounted in the reel body, means for applying a drag to said spool to resist rotation of said spool, said means comprising a non-rotatable, axially movable drag plate, a drag washer sandwiched between the drag plate and the spool, adjusting means for increasing and decreasing the pressure on the drag washer which increases and decreases the drag applied to said spool, the improvement comprising said drag washer being a phenolic fiber material at least partially saturated with a predetermined weight percentage of a solution comprising oil and a viscosity modifying oil additive.

2. The fishing reel as claimed in claim 1 wherein said phenolic fiber material contains 3.9 to 4.0% by weight of oil and an oil additive.

3. The fishing reel as claimed in claim 1 wherein said oil is 10 weight oil.

* * * * *